(12) United States Patent
Bharath (10) Patent No.: US 9,736,204 B2
(45) Date of Patent: Aug. 15, 2017

(54) MEDIA CONTENT DELIVERY OVER TELEPHONE NETWORKS

(71) Applicant: Pandora Media, Inc., Oakland, CA (US)

(72) Inventor: Shriram Bharath, Oakland, CA (US)

(73) Assignee: Pandora Media, Inc., Oakland, CA (US)

(*) Notice: Subject to any disclaimer, the term of this patent is extended or adjusted under 35 U.S.C. 154(b) by 117 days.

(21) Appl. No.: 14/749,393

(22) Filed: Jun. 24, 2015

(65) Prior Publication Data
US 2016/0381103 A1     Dec. 29, 2016

(51) Int. Cl.
| | | |
|---|---|---|
| *H04M 3/42* | (2006.01) | |
| *H04L 29/06* | (2006.01) | |
| *H04W 76/02* | (2009.01) | |
| *H04M 3/02* | (2006.01) | |

(52) U.S. Cl.
CPC ...... *H04L 65/4084* (2013.01); *H04L 65/1069* (2013.01); *H04M 3/02* (2013.01); *H04W 76/02* (2013.01)

(58) Field of Classification Search
CPC   H04L 2463/101; H04L 63/0428; H04L 63/10
USPC ................................ 455/414.1, 415
See application file for complete search history.

(56) References Cited

U.S. PATENT DOCUMENTS

| | | | | |
|---|---|---|---|---|
| 6,970,915 | B1* | 11/2005 | Partovi | H04M 3/4938 709/217 |
| 7,783,024 | B1* | 8/2010 | Croak | G06Q 30/0633 235/380 |
| 2004/0107821 | A1* | 6/2004 | Alcalde | G06F 17/30743 84/608 |
| 2006/0056324 | A1* | 3/2006 | Hyyppa | G06Q 20/123 370/310 |
| 2006/0270388 | A1 | 11/2006 | Veeramachaneni et al. | |
| 2010/0202435 | A1 | 8/2010 | Moinzadeh et al. | |
| 2014/0098715 | A1 | 4/2014 | Morsy et al. | |

FOREIGN PATENT DOCUMENTS

| | | |
|---|---|---|
| KR | 2005-0015660 | 2/2005 |
| KR | 2007-0023378 | 2/2007 |

OTHER PUBLICATIONS

A.A.K., "Marketing a missed call," Schumpeter, Business and Management, The Economist, Aug. 17, 2013, 7 Pages, [online] [retrieved on Mar. 2, 2015] Retrieved from the internet <URL:http://www.economist.com/blogs/schumpeter/2013/08/mobile-advertising-india>.

(Continued)

*Primary Examiner* — Dung Hong
(74) *Attorney, Agent, or Firm* — Fenwick & West LLP (57) ABSTRACT

A media service server provides media content to users over telephone networks. The media content server receives a request for media items, where the request is a call placed by a phone. The media content server identifies a user associated with the request, and establishes an audio communication channel with the phone. The media content server selects a media item for the user based on an identity of the user, and provides the media item to the user by playing content of the media item to the user over the audio communication channel.

15 Claims, 4 Drawing Sheets

(56) References Cited

OTHER PUBLICATIONS

Amberber, E., "ZipDial, the Indian company that turns 'missed calls' into business, gets acquired by Twitter," YourStory Media, Jan. 20, 2015, 3 pages, [online] [retrieved on Mar. 2, 2015] Retrieved from the internet <URL:http://yourstory.com/2015/01/twitter-zipdial-acquisition/>.

Bergen, M., "Facebook To Use 'Missed Calls' To Dial Up Ad Dollars In India," Advertising Age, Jul. 2, 2014, 7 pages, [online] [retrieved on Mar. 2, 2015] Retrieved from the internet <URL:http://adage.com/article/digital/facebook-introduces-missed-call-ad-format-india/293986/>.

Wasserman, T., "Facebook Launches 'Missed Call' Ads in India," Mashable.com, Jul. 2, 2014, 4 Pages, [online] [retrieved on Mar. 2, 2015] Retrieved from the internet <URL: http://mashable.com/2014/07/02/facebook-missed-call-ads-india/>.

PCT International Search Report and Written Opinion for PCT/US2016/029915, Jul. 26, 2016, 7 Pages.

\* cited by examiner

MEDIA CONTENT DELIVERY OVER TELEPHONE NETWORKS

BACKGROUND

Field of Disclosure

The present invention generally relates to the delivery of content, and more specifically to ways of delivering media content via telephone networks.

Description of the Related Art

Music streaming services have become ubiquitous. Users can stream music to their devices over the Internet or cellular networks. However, since music streaming services demand reliable network connections or satisfactory bandwidth, availability of uninterrupted music streaming is geographically limited as not all areas have good network coverage or bandwidth. People may want to listen to music in areas where no network connection is available, or where the bandwidth of the available network is limited. In addition, users may need to monitor their music streaming closely since cellular data or network consumption can be costly. Excessive network usage may cause reduction of network speed, thereby slowing down users' daily tasks.

SUMMARY

The above and other needs are met by a computer-implemented method, a non-transitory computer-readable storage medium storing executable code, and a device for providing media content via a telephone network.

In one embodiment, a computer-implemented method for providing media content, includes receiving a request for media items, where the request is a call placed by a phone. The computer-implemented method identifies a user associated with the request, and establishes an audio communication channel with the phone. The computer-implemented method selects a media item for the user based on an identity of the user, and provides the media item to the user by playing content of the media item to the user over the audio communication channel.

In one embodiment, a non-transitory computer-readable medium comprising computer program instructions executable by a processor. The computer program instructions comprise instructions for receiving a request for media items, where the request is a call placed by a phone. The computer program instructions comprise instructions for identifying a user associated with the request, and instructions for establishing an audio communication channel with the phone. The computer program instructions comprise instructions for selecting a media item for the user based on an identity of the user, and instructions for providing the media item to the user by playing content of the media item to the user over the audio communication channel.

In one embodiment, a system comprises a processor for executing computer program instructions and a non-transitory computer-readable storage medium comprising computer program instructions executable by the processor. The computer program instructions comprise instructions for identifying a user associated with the request, and instructions for establishing an audio communication channel with the phone. The computer program instructions comprise instructions for selecting a media item for the user based on an identity of the user, and instructions for providing the media item to the user by playing content of the media item to the user over the audio communication channel.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
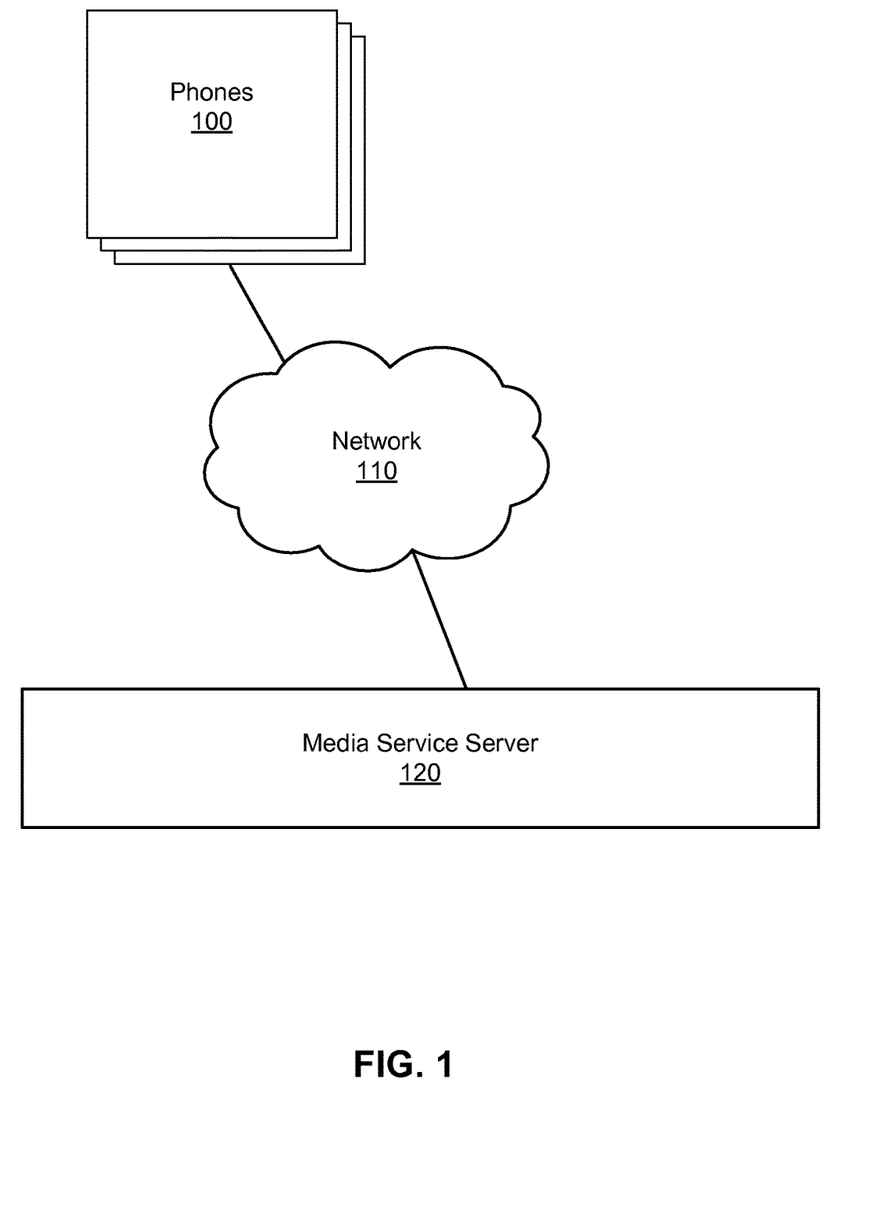
FIG. 1 is a high-level block diagram illustrating an embodiment of an environment for providing media content via a telephone network.

FIG. 1 is a high-level block diagram illustrating an embodiment of an environment for providing media content via a telephone network. The environment includes one or more phones 100 connected by a network 110 to a media service server 120. Via phones 100, users or listeners may receive music delivery services provided by the media service server 120. In the illustrated example, only one media service server 120 is shown, but there may be multiple instances of the media service server. For example, there may be thousands or millions of phones 100 in communication with one or more media service servers 120.

The phones 100 are devices that permit audio communication between users and the media service server 120. The phones 100 allow users to obtain audio content from, and enable interactions with, the media service server 120. For example, users may call particular phone numbers to access music delivery services provided by the media service server 120. A phone 100 is identified by a unique telephone number, and the media service server 120 or other devices may initiate a call with the phone using its telephone number. For example, the media service server 120 can receive a call from a phone 100, note the telephone number of the phone, and initiate a call back to the phone.

The phones 100 establish audio communication channels, over which users may obtain media content such as music. The audio communication channels allow audio or voice communication between a user and the media service server 120. Electrical signals converted from media content are transmitted in the audio communication channels. As such, users may still obtain media content when data service is not available or available bandwidth is insufficient for streaming services. The phones 100 may only have the ability to establish audio communication and not be equipped to access data networks. In some cases, one or more of the phones 100 may also have the ability to access data networks.

The phones 100 may be, for example, landline telephones, mobile phones, or cellular phones that have keypads. The phones 100 include the hardware and software needed to input and output sound (e.g., speakers and a microphone) and connect to the network 110 (e.g., via wired or wireless communication channels). The phones 100 may be feature phones that have no data network access capabilities and do not require mobile data services. The phones 100 may be smartphones with integrated computing abilities that are based on operating systems such as ANDROID® or APPLE® IOS®, tablet computers, laptop computers, desktop computers, electronic stereos in automobiles or other vehicles, or any other type of network-enabled device on which digital content may be listened to or otherwise experienced.

The media service server 120 provides music delivery service to phones 100. The media service server 120 allows users to create and/or select media channels. A media channel is a playlist of media items that are grouped together, where the media items share one or more common media features. A media item is a form of media content and characterized by media features describing musicological features of the media item (e.g., tempo, style, instrument). For example, the media service server 120 has associated phone numbers which may be called by users to access the music delivery service. Users may provide a value—known as a "seed input"—for creating or selecting a media channel to request media content from the media service server 120. In one embodiment, a phone number is associated with a seed musical item that serves as a seed input (e.g., a song, an album, a musical artist, a musical genre (e.g., rock, rap, or classical), or a musical time period (e.g., Baroque, $20^{th}$ century, 80s hits, or 60s chillouts)).

Users may select a seed musical item by calling a particular phone number that corresponds to the seed musical item, such as a first number for a song "Bohemian Rhapsody", a second number for rock music, or a third number for $20^{th}$ century music, and the like. In one embodiment, a phone number is not associated with any seed musical item; rather, a general access phone number leads to a music menu where a user may select a seed musical item as directed (e.g., "Press or say 1 for Bohemian Rhapsody, 2 for rock music, 3 for $20^{th}$ century music"). Thus, in some embodiments users may select a seed musical item by calling a particular number, entering selections into dial or numeric keypads, or speaking the choice of selection. Further, in some embodiments, the seed musical item is determined at least in part based on the number of the phone that is performing the calling, and not on the phone number of the media service server 120 that the phone calls. In such embodiments, the phone number of the phone 100 is used to identify a profile of a user associated with the phone, and the profile contains information about the preferences (e.g., musical preference) of the user, which is used wholly or partially to determine the seed musical item.

In one particular embodiment referred to throughout the remainder of the specification, media items are songs. It is appreciated, however, that in other embodiments a media item alternatively and/or additionally includes other forms of audio content, such as pieces of music, audio recordings, audiobooks, etc.

The media service server 120 provides media content to users. The media service server 120 receives requests for content from phones 100, via voice calls by the phones. The media service server 120 may call back users whose calls were unanswered. In various embodiments, users pay the owners or operators of portions of the network 110 for the audio service (e.g., via cellular communications) when calls initiated by the users to the media service server 120 are connected; in contrast, media services provided by the media service server 120 are available at no charge to the users when the media service server 120 initiates the calls. For example, when a user calls a number associated with the media service server 120 and stays online while the audio communication channel with the media service server 120 is established and the media items are provided over the audio communication channel, the user needs to pay for the resulting audio communication. In contrast, when a user calls a number associated with the media service server 120, hangs up, and answers the subsequent callback initiated by the media service server 120, the services delivered to the user are free for the user.

After an audio communication channel is established between a phone 100 and the media service server 120, the media service server 120 delivers media content to the phone 100 by playing the media content over the audio communication channel. The media service server 120 plays audio content of media items according to user's selection. The media service server 120 identifies a media channel associated with the request for content, and provides media items associated with the media channel to the requesting phone 100. As explained above, a music channel is a playlist of songs that are grouped together, where the songs share one or more common media features. The media service server 120 may initially generate a media channel based on a seed input from the user (e.g., name of a song or band) using a list of global list of media items associated with the input. In addition, the media service server 120 may provide media content streaming services from which users may obtain media content.

In some embodiments, the media service server 120 may generate the music channel by selecting songs for the music channel according to a user's request, selection of a seed musical item, and/or the user's preferences. The media service server 120 provides audio content associated with the requested music channel to phones 100. In addition, the media service server 120 provides personalized music delivery to users. In one embodiment, a user profile is created and associated with a telephone number of a phone 100. In this embodiment, the user profile records the user's preferences for media content, and based on a seed musical item and a user's request, the media service server 120 selects media items according to the user's preferences for a particular music channel.

The media service server 120 collects feedback information from users, to whom media items are presented by phones 100 using audio communication. The feedback information may include express feedback or implicit feedback. Express feedback is feedback provided by users that directly expresses the users' preferences (e.g., like or dislike) for media items. In contrast, implicit feedback is feedback that indirectly describes a user's preferences for a media item, such as the user's actions in response to the media item. The media service server 120 associates collected feedback information with a media item, as well as analyzing the collected feedback information and/or associating the analysis with the media item. Based on the collected feedback information, the media service server 120 may generate media channels that are specific to the user using a phone 100 associated with a phone number. By collecting and associating feedback information for each media item, the media service server 120 is able to effectively analyze the collected feedback information to identify a user's preferences in media features and correlations between media item preferences of the user and a media channel.

The media service server 120 may analyze the collected feedback information to identify a user's preferences in media features and correlations between media item preferences of a user and a media channel. The media service server 120 may identify and associate media features that characterize media items and use the media features to represent the media items. Accordingly, the media service server 120 may identify correlations between media features and a media channel. The identified correlations therefore indicate a user's preference for particular media features of media items for a media channel. For example, the media service server 120 may determine from the collected feedback information that the user dislikes presentation of media items characterized by certain media features in a media channel. The media service server 120 may use the identified correlations between media features and a media channel to identify media items that the user prefers in a music channel.

The media service server 120 presents advertisements to phones 100 between presentations of media items. The media service server 120 may select advertisements for presentation according to the user profile associated with a telephone number of a phone 100. The media service server 120 may infer location information from the telephone number of the phone 100 and/or from the physical location of a network access point (e.g., a cellphone tower) and store the resulting location information in the user profile. In addition, the media service server 120 may infer advertisement targeting information (e.g., age, demographics) from a user's reaction to media items and advertisement and stores such information in the user profile. The media service server 120 may select advertisements for presentation based on the location information and/or advertisement targeting information stored in the user profile associated with the phone 100.

The network 110 represents the communication pathways between phones 100 and the media service server 120. The network 110 is a telephone network providing audio communication capabilities. The network 110 allows the phones 100 to establish audio communication channels with the media service server 120. The network 110 may be a landline network, a wireless network, or a private network that uses standard communications technologies and/or protocols. For example, the network 110 may be a Public Switched Telephone Network (PSTN), a cellular network (e.g., Global System for Mobile Communications (GSM) network or Personal Communication Service (PCS) network), or a Global area network (GAN) network. The network 110 transmits electrical signals converted from media content, for example, as radio waves to the phones 100.

Figure 2:
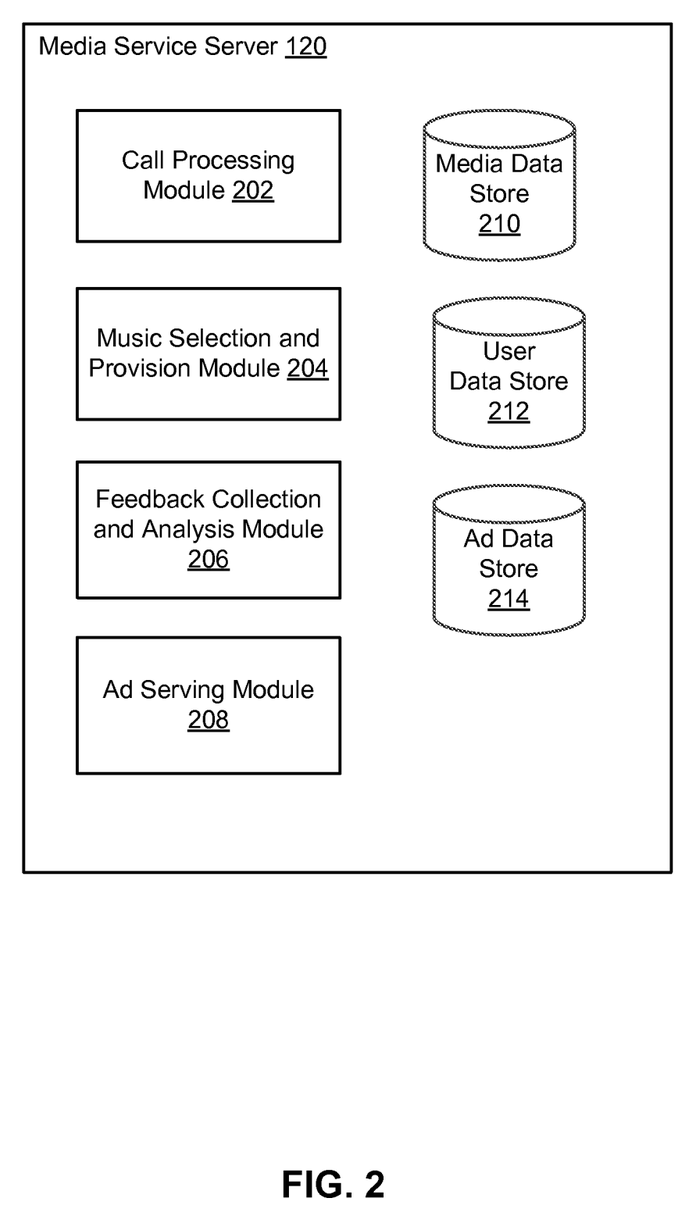
FIG. 2 is a high-level block diagram illustrating a detailed view of modules within the media service server of FIG. 1, according to one embodiment.

The media service server 120 is now described in more detail with respect to FIG. 2. FIG. 2 is a high-level block diagram illustrating a detailed view of modules within the media service server 120 according to one embodiment. Some embodiments of the media service server 120 have different modules than those described here. Similarly, the functions can be distributed among the modules in a different manner than is described here. The media service server 120 includes a call processing module 202, a music selection and provision module 204, a feedback collection and analysis module 206, an advertisement serving module 208, a media data store 210, a user data store 212, and an advertisement data store 214.

The media data store 210 stores information relating to media items, such as the media items and associated metadata (e.g., artist, name of track, etc.), playlists, and mappings of media items to media features. As mentioned above, the media features (also referred to as musicological features) describe musicological characteristics of media items. For example, if the media item is a song, the media features of the song may indicate the underlying musicological characteristics of the song such as, for example, the gender of the singer, the type of background vocals, the tempo, the quality of the tones (e.g., pure or distorted), whether the melody dominates the composition, or an amount of gospel influence. A given media item may have many media features, such as 100-500 media features. In one embodiment, mappings of media items to media features are established using the MUSIC GENOME PROJECT database created by PANDORA MEDIA, INC. of Oakland, Calif.

The user data store 212 stores user profiles associated with telephone numbers of phones 100. As users are identified by telephone numbers, a user profile is created for and associated with one telephone number. A user profile may be further associated with an account that the user uses to obtain media content streaming services (e.g., web-based, application-based). A user profile includes information describing users' preferences for media items and/or media features. In one embodiment, a user profile may include information describing a user's preferences for media items represented as preference descriptors. In addition, the user profile may store media features characterizing the media items corresponding to information describing the user's preferences. A user profile may further include music channels and/or stations created and/or selected by the user.

The advertisement data store 214 stores advertisements for presentation to different users. The advertisement data store 214 may associate and store information such as advertisement properties (e.g., length, category, time period) and selection data (e.g., geographic location or targeted audience) with advertisements. Such information may provide a basis for selection of advertisement.

The call processing module 202 establishes audio communication channels with phones 100. The call processing module 202 receives incoming calls from users, processes incoming calls, and places outgoing calls to users. The call processing module 202 identifies the telephone number associated with an incoming call. Based on the identified telephone number, in the user data store 212, the call processing module 202 identifies a user profile associated with the telephone number. When the call processing module 202 cannot identify a user profile by a telephone number in the user data store 212, the call processing module 202 may create a user profile, associate it with the telephone number, and store the user profile in the user data store 212.

The call processing module 202 also processes incoming calls according to telephone numbers called by the incoming calls. For example, the call processing module 202 may identify a seed musical item (e.g., a song, an album, a musical artist, the musical genre (e.g., rock, rap, or classical), a music time period (e.g., Baroque, $20^{th}$ century, 80s hits, or 60s chillouts), or a music channel) associated with the telephone number. The call processing module 202 may identify a phone menu associated with the telephone number. For example, the phone menu may be a touch-tone interface which allows the user to access settings or other seed stations. The call processing module 202 registers all incoming calls and places outgoing calls to users whose calls are missed. The call processing module 202 may register all incoming calls by the phone numbers of the phones from which the incoming calls are placed as well as the numbers that the incoming calls are calling. The call processing module 202 may record whether the incoming calls are answered or missed and/or the time when the incoming calls are received. In cases where an incoming call is missed, the call processing module 202 calls the phone numbers from which the incoming call originated. The call processing module 202 may place the outgoing calls (the calls back in response to the missed incoming calls) in an order based on the time when the incoming calls are received. In some embodiments, the media service server 120 may determine a seed musical item based on the number a missed incoming call is calling and plays the seed musical item when an outgoing call is answered by the phone at the phone number from which the missed call originated.

The music selection and provision module 204 selects songs and plays the selected songs over the audio connection between users and the media service server 120. The music selection and provision module 204 converts the media content into electrical signals, which is transmitted as radio waves and converted back into sound at the phones 100. The music selection and provision module 204 selects songs based on a seed value received from a user and/or the user's preferences for media items or features. The music selection and provision module 204 may generate music playlists based on the selected songs. A seed value is an input from a user that describes what type of media channel he/she would like to form. The user may provide the seed value by calling a particular number associated with the seed value or selecting a seed value from a phone menu. A seed value may be, e.g., a name of a song, a name of a band, a name of genre of music, etc., and in some embodiments, the seed value may be characterized by one or more media features. The user's preferences may be identified based on the telephone number of the phone 100 from which a user is calling, which may be identified by the call processing module 202.

The music selection and provision module 204 may extract media features from the seed value using, for example, the mappings of media items to corresponding media features in the media data store 210. The music selection and provision module 204 may identify preference descriptors describing a user's preferences for media features or media items. The music selection and provision module 204 uses the media features extracted from the seed value, the preference descriptors identified based on the telephone number, and the mappings of media items to media features to dynamically generate a media item playlist. The media item playlist includes media items having media features similar to the media features extracted from the seed value and/or the preference descriptors identified based on the telephone number. For example, given a seed value of a band, the music selection and provision module 204 identifies media features that characterize the band. The music selection and provision module 204 further identifies preference descriptors based on the telephone number. The music selection and provision module 204 identifies songs with the same or similar media features as the media features that characterize the band and/or the preference descriptors. The music selection and provision module 204 then uses the identified songs to generate a media playlist which is associated with the band.

The music selection and provision module 204 may further select media items for a music playlist using correlations between the media features and a music playlist. The music selection and provision module 204 identifies media features that the user prefers given the music playlist based on the correlations between the media features and the music playlist produced by the feedback collection and analysis module 206 and selects media items based on the identified media features. For example, based on the identified media features and the mappings of music items to the media features, the music selection and provision module 204 may identify media items. The music selection and provision module 204 then selects a media item from the media data store 210 based on the correlation, and provides the selected media item to the phone 100. In some embodiments, the music selection and provision module 204 may rank the selected songs, for example, based on preference scores that indicate how likely users may play the songs through completion. Media items in the media data store 210 that have preference scores below a threshold value are removed thereby to prevent disliked media items from being selected. Accordingly, the music selection and provision module 204, in effect, customizes the media playlist to users' preferences.

The feedback collection and analysis module 206 collects and analyzes feedback information provided by users from phones 100. For example, a user may provide feedback on media items through touch-tone dialing (e.g., 1 indicates like, 2 indicates dislike, 3 indicates skip, 4 indicates pause, and 5 indicates send texts identifying title and artist of current or previous song). A user may provide feedback on media items via user interfaces associated with the media content streaming services provided by the media service server 120. The feedback collection and analysis module 206 associates the collected feedback information with user profiles associated with telephone numbers of the phones 100. The feedback collection and analysis module 206 updates and maintains the feedback information associated with a user profile. The stored feedback information includes express feedback as well as implicit feedback provided by users with respect to media items, for example, during presentations of media items. The collected feedback information indicates users preferences, such as express (e.g., like, dislike, or numerical ratings to indicate magnitudes of likes or dislikes) and inferred preferences for media items.

For example, express feedback may be a user rating of a media item specified by a user expressly entering a numerical value or speaking his/her opinions, selecting different numbers to respectively indicate approval or disapproval, or otherwise performing actions that directly expresses his/her preference for a media item. Implicit feedback may be positive or negative. Examples of positive implicit feedback include allowing a media item to play through until completion, saving a media item to a user's favorite list, sharing a media channel with another user of the media service server 120, changing a station channel (media channel), and adding a media channel based on the media item. Examples of negative implicit feedback include the user skipping a media item after partial playback of the media item, pausing presentation of a media item, and changing a media channel during playing of a media item.

The feedback collection and analysis module 206 analyzes the collected feedback information. The feedback collection and analysis module 206 may determine a user's preference for a media item based on all or a portion of the collected feedback information. Users' preferences for media items (i.e., likes and dislikes) may be determined from the collected feedback information. Magnitudes of these preferences (i.e., the amount of the likes and dislikes) may be further determined. For a media item, a preference score may be determined for a user to indicate the user's preferences and magnitudes. For example, the preference score may be represented as a value between −1 and 1, where a negative value indicates dislike and a positive value indicates like, and the absolute value indicates the magnitude. For each media playlist created for a user, each media item has a preference score for that user. The feedback collection and analysis module 206 assigns weights to various types of feedback signals that may be present in the user preference information to determine the preference score. Very strong signals of preference (e.g., an express like or dislike) are afforded relatively higher weights, while weaker signals of preference such as various types of implicit feedback are afforded relatively lower weights. The weighted feedback is combined to determine the preference score.

In one embodiment, the preference score of a media item may indicate a likelihood of a user allowing the media item to play through to completion when the media item is presented to the user. In this context, the feedback collection and analysis module 206 generates the preference score using the collected feedback information. For example, if the collected feedback information indicates that 8 out of the last 10 times the media item was presented to the user it was played through to completion, the feedback collection and analysis module 206 may determine a relatively high preference score for the media item (e.g., 80% chance that the user would allow the media item to play through to completion). For different music playlists, a media item may have different preference scores as a user may have different preferences for different media features.

In each music playlist, the feedback collection and analysis module 206 may associate the determined preference score with the media features that characterize the media item. For a given presentation of a media item to a user, the feedback collection and analysis module 206 identifies the specific media features present in the media item based on the mappings between media items and associated media features described in the media data store 210. The feedback collection and analysis module 206 then associates a user's preference score for the presentation of the media item with the constituent media features of the media item. Since a user is presented with many media items, the feedback collection and analysis module 206 through this process may generate a large amount of information describing the user's preferences for various media item features. This information may be associated with a user and stored as preference descriptors in the user profile in the user data store 212.

In some embodiments, the feedback collection and analysis module 206 uses the preference descriptors to correlate user preferences with media features to ascertain a user's preferences for particular media features for a music playlist. For a user, the feedback collection and analysis module 206 gathers the preference descriptors associated with the user, and then analyzes, for example, using machine learning techniques, the preference descriptors to determine how the user's preference scores for the media features correlate with a particular music playlist. For example, the feedback collection and analysis module 206 may determine that the user prefers a particular media feature (e.g., music instrument including violins) for a particular music playlist. In some embodiments, the music selection and provision module 204 may select media items using a playlist or a music channel that is associated with the user profile. The music selection and provision module 204 may select a media item from the media data store 210 that is on the media playlist and provide it to the phone 100.

The advertisement serving module 208 provides advertisements to phones 100, for example, between presentations of media items. The media service server 120 may select advertisements, from an advertisement data store 214, for presentation to a phone 100 according to the user profile associated with the telephone number of the phone 100. The media service server 120 may infer location information from the telephone number of the phone 100 and/or from the physical location of a network access point (e.g., a cellphone tower). The location information may be stored in the user profile associated with the telephone number. In addition, the media service server 120 may infer advertisement targeting information (e.g., age, demographics) from a user's reaction to media items and advertisement and stores such information in the user profile. The media service server 120 may select advertisements for presentation based on the location information and/or advertisement targeting information stored in the user profile associated with the phone 100 as well as advertisement properties and selection data associated with advertisements.

Figure 3:
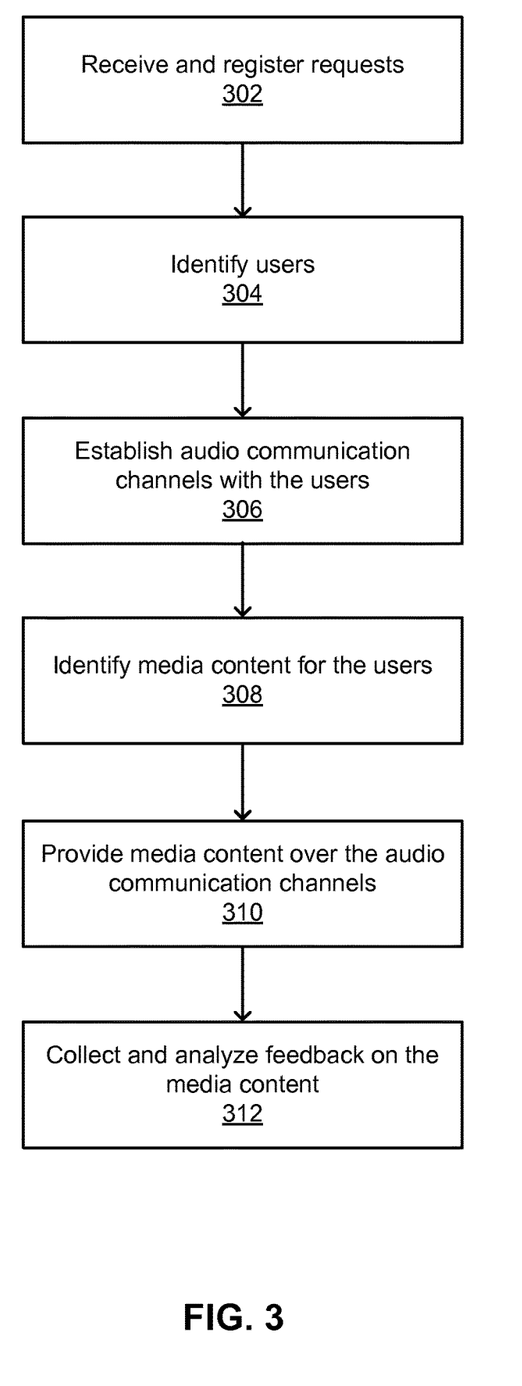
FIG. 3 is a flowchart illustrating a process of providing media items to phones over a telephone network, according to one embodiment.

FIG. 3 is a flowchart illustrating a process of providing media items to phones over a network, according to one embodiment. In one embodiment, the process of FIG. 3 is performed by the media service server 120. Other entities may perform some or all of the steps of the process in other embodiments. Likewise, embodiments may include different and/or additional steps, or perform the steps in different orders. The media service server 120 receives and registers 302 requests for media items from users. Users request media items by calling a number provided by the media service server 120. The media service server 120 may provide a one or more numbers that are associated with seed musical items (e.g., a song, an album, a musical artist, a musical genre (e.g., rock, rap, or classical), or a music time period (e.g., Baroque, $20^{th}$ century, 80s hits, or 60s chillouts)), and users may select a seed musical item by calling a corresponding one of the phone numbers. The media service server 120 may provide a general access phone number leading to a music menu where a user may select a seed musical song as directed. Users may select a seed musical item (e.g., a song, an album, a musical artist, a musical genre, etc.) by calling a particular number, entering selections into dial or numeric keypads, or speaking the choice of selection.

The media service server 120 identifies 304 the users associated with the requests (phone calls) received. The media service server 120 processes a request to identify the telephone number of the phone 100 from which a request is generated and identifies the user based on the telephone number. The media service server 120 establishes 306 audio communication channels with the users. An audio communication channel is established when the media service server 120 answers a phone call. When an incoming call is missed, the media service server 120 calls the phone 100 of the user and the audio communication channel is established when the user answers the phone call from the media service server 120.

The media service server 120 identifies 308 media content for the users. The media content may be identified for a user based on a seed value received from a user and/or the user's preferences for media items or features. A seed value is an input from a user that describes what type of media channel he/she would like to form. The user may provide the seed value by calling a particular number associated with the seed value or selecting a seed value from a phone menu. The user's preferences may be identified based on the telephone number of the phone from which a user is calling.

The media service server 120 provides 310 media content over the audio communication channels to the users. The media service server 120 provides 310 the media content by playing the media content over the audio communication channels.

The media service server 120 collects and analyzes 312 feedback on the provided media content. The feedback including users' explicit and implicit feedback that are based on users' actions during provision of the media content. User may provide explicit and implicit feedback on media items via user interfaces. The media service server 120 associates the collected feedback information with the user. The media service server 120 may analyze the collected feedback information to determine users' preferences for media items (i.e., likes and dislikes). A user's preference for media items may be associated with the user. The media service server 120 may determine media content items to be provided to the user based on the user's preference for media items.

Figure 4:
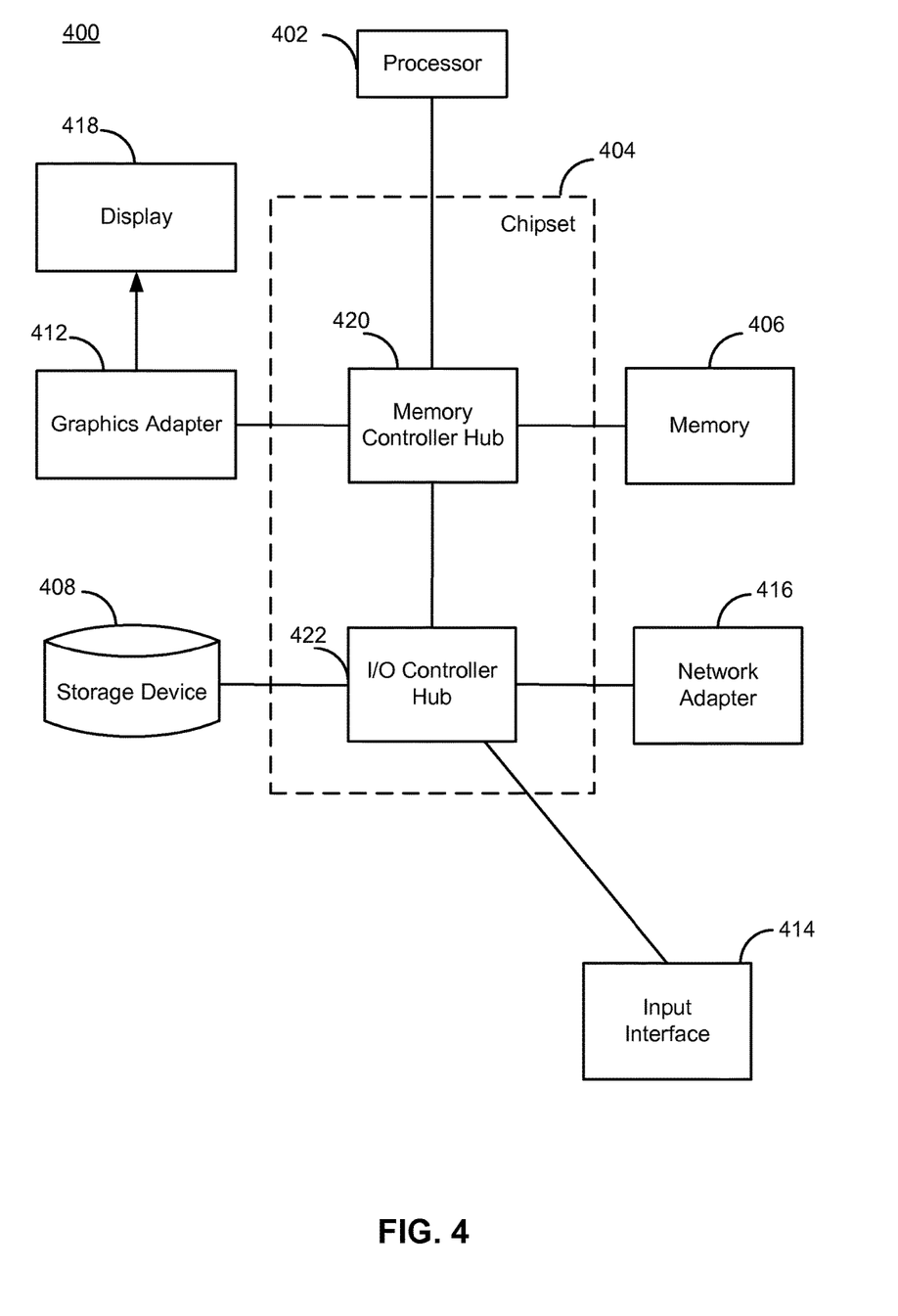
FIG. 4 is a high-level block diagram illustrating an example computer for implementing the entities shown in FIG. 1.

Turning now to a discussion of the implementation of a phone 100 and/or the media service server 120, FIG. 4 is a high-level block diagram illustrating an example computer 400 for implementing the entities shown in FIG. 1. The computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, an input interface 414, and network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The input interface 414 is a touch-screen interface, a mouse, track ball, or other type of pointing device, a keyboard, or some combination thereof, and is used to input data into the computer 400. In some embodiments, the computer 400 may be configured to receive input (e.g., commands) from the input interface 414 via gestures from the user. The graphics adapter 412 displays images and other information on the display 418. The network adapter 416 couples the computer 400 to one or more computer networks.

The computer 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 408, loaded into the memory 406, and executed by the processor 402.

The types of computers 400 used by the entities of FIG. 1 can vary depending upon the embodiment and the processing power required by the entity. For example, the media service server 120 can run in a single computer 400 or multiple computers 400 communicating with each other through a network such as in a server farm. The computers 400 can lack some of the components described above, such as graphics adapters 412, and displays 418.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for providing media content, comprising:
    receiving a request for media items, the request being a call to a called telephone number placed by a phone having a calling telephone number;
    identifying a user associated with the request;
    establishing an audio communication channel with the phone, establishing the audio communication channel comprising:
        registering the request based on the calling telephone number and the called telephone number,
        identifying the registered request as unanswered, and placing a phone call to the calling telephone number responsive to identifying the registered request as unanswered;

selecting a media item for the user based on an identity of the user; and providing the media item to the user by playing content of the media item to the user over the audio communication channel.

2. The computer-implemented method of claim 1, further comprising:

processing the received request to identify the calling telephone number; and identifying the user associated with the calling telephone number.

3. The computer-implemented method of claim 1, further comprising:

collecting feedback of the user on the media item, the feedback of the user indicating preferences of the user for the media item and including explicit and implicit feedback;

analyzing the feedback of the user to determine preferences of the user for media features; and associating the preferences of the user for media features with the user.

4. The computer-implemented method of claim 3, wherein collecting the feedback of the user comprises receiving a signal corresponding to an action of the user during the provision of the media content item.

5. The computer-implemented method of claim 1, further comprising selecting the media item based on the called telephone number.

6. The computer-implemented method of claim 5, further comprising determining media features associated with the media item requested, wherein the media item has media features similar to the media features associated with the media item requested.

7. The computer-implemented method of claim 5, further comprising identifying preference descriptors associated with the user and describing preferences of the user for media features, wherein the media items are further determined based on the preference descriptors.

8. The computer-implemented method of claim 7, further comprising determining a preference score for the media item using the preference descriptors associated with the user, wherein the preference descriptors comprises feedback information on media items collected from the user.

9. The computer-implemented method of claim 1, further comprising selecting an advertisement based on the identity of the user and providing the advertisement over the audio communication channel to the user.

10. The computer-implemented method of claim 1, wherein the media items comprise a song.

11. A non-transitory computer-readable storage medium comprising computer program instructions executable by a processor, the computer program instructions comprising:

instructions for receiving a request for media items, the request being a call to a called telephone number placed by a phone having a calling telephone number;

instructions for identifying a user associated with the request;

instructions for establishing an audio communication channel with the phone, wherein the instructions for establishing the audio communication channel comprise:

instructions for registering the request based on the calling telephone number and the called telephone number, instructions for identifying the registered request as unanswered, and instructions for placing a phone call to the calling telephone number responsive to identifying the registered request as unanswered;

instructions for selecting a media item for the user based on an identity of the user; and instructions for providing the media item to the user by playing content of the media item to the user over the audio communication channel.

12. A system comprising:

a processor for executing computer program instructions; and a non-transitory computer-readable storage medium comprising computer program instructions executable by the processor, the computer program instructions comprising:

instructions for receiving a request for media items, the request being a call to a called telephone number placed by a phone having a calling telephone number;

instructions for identifying a user associated with the request;

instructions for establishing an audio communication channel with the phone, wherein the instructions for establishing the audio communication channel comprise:

instructions for registering the request based on the calling telephone number and the called telephone number, instructions for identifying the registered request as unanswered, and instructions for placing a phone call to the calling telephone number responsive to identifying the registered request as unanswered;

instructions for selecting a media item for the user based on an identity of the user; and instructions for providing the media item to the user by playing content of the media item to the user over the audio communication channel.

13. The system of claim 12, wherein the computer program instructions further comprise:

instructions for processing the received request to identify the calling telephone number; and instructions for identifying the user associated with the calling telephone number.

14. The system of claim 12, wherein the computer program instructions further comprise:

instructions for collecting feedback of the user on the media item, the feedback of the user indicating preferences of the user for the media item and including explicit and implicit feedback;

instructions for analyzing the feedback of the user to determine preferences of the user for media features; and instructions for associating the preferences of the user for media features with the user.

15. The system of claim 12, wherein the media items comprise a song.

* * * * *